US012692410B2

(12) United States Patent
Kim et al.

(10) Patent No.: US 12,692,410 B2
(45) Date of Patent: Jul. 28, 2026

(54) HIGH TEMPERATURE STABILITY EPOXY RESIN COMPOSITION AND ENCAPSULATION MATERIAL COMPRISING THE SAME

(71) Applicant: SOLUS ADVANCED MATERIALS CO., LTD., Iksan (KR)

(72) Inventors: Hongsuk Kim, Yongin (KR); Jongtae Lim, Yongin (KR)

(73) Assignee: SOLUS ADVANCED MATERIALS CO., LTD., Iksan (KR)

( * ) Notice: Subject to any disclaimer, the term of this patent is extended or adjusted under 35 U.S.C. 154(b) by 1088 days.

(21) Appl. No.: 17/768,458

(22) PCT Filed: Apr. 7, 2022

(86) PCT No.: PCT/KR2022/005068

§ 371 (c)(1),
(2) Date: Apr. 12, 2022

(87) PCT Pub. No.: WO2023/128067

PCT Pub. Date: Jul. 6, 2023

(65) Prior Publication Data

US 2025/0368849 A1 Dec. 4, 2025

(30) Foreign Application Priority Data

Dec. 30, 2021 (KR) ........................ 10-2021-0192147

(51) Int. Cl.

| | |
|---|---|
| ***C08F 2/46*** | (2006.01) |
| ***C08F 2/50*** | (2006.01) |
| ***C08G 61/04*** | (2006.01) |
| ***C09D 163/00*** | (2006.01) |

(52) U.S. Cl.
CPC .................................. *C09D 163/00* (2013.01)

(58) Field of Classification Search
CPC ............... C08F 2/46; C08F 2/50; C08G 61/04
USPC ....................... 522/6, 71, 189, 184, 1; 520/1
See application file for complete search history.

(56) References Cited

FOREIGN PATENT DOCUMENTS

| | | | | | |
|---|---|---|---|---|---|
| CN | 102648247 | A | | 8/2012 | |
| CN | 106814538 | A | | 6/2017 | |
| JP | 2019073574 | A | * | 5/2019 | |
| JP | 2020-042089 | A | | 3/2020 | |
| JP | 2021093422 | A | | 6/2021 | |
| JP | 2021178880 | A | | 11/2021 | |
| KR | 1020150090063 | A | | 8/2015 | |
| KR | 1020210061392 | A | | 5/2021 | |
| KR | 20210116425 | A | | 9/2021 | |
| KR | 20210152327 | A | | 12/2021 | |
| WO | 2014083850 | A1 | | 6/2014 | |
| WO | 2017191801 | A1 | | 11/2017 | |
| WO | 2019187587 | A1 | | 10/2019 | |
| WO | 2020 045560 | A1 | | 3/2020 | |
| WO | WO-2023128068 | A1 | * | 7/2023 | ........... H10K 50/844 |

OTHER PUBLICATIONS

Tanaka, JP 2019073574 Machine Translation, May 16, 2019 (Year: 2019).*
Kim et al, WO 2023128068 Machine Translation, Jul. 6, 2023 (Year: 2023).*
International Search Report dated on Sep. 19, 2022.
JP OA Dated Feb. 20, 2024.
CN Office Action dated Jul. 1, 2025.
Search report.
Office Action From Korean Patent Office Dated Feb. 23, 2026 Issued for Corresponding Korean Patent Application.

* cited by examiner

*Primary Examiner* — Jessica Whiteley
(74) *Attorney, Agent, or Firm* — Harvest IP Law, LLP

(57) ABSTRACT

Proposed are an epoxy resin composition having high-temperature stability and an encapsulant including the same. The composition can be applied to various gap filling methods in which a low-viscosity liquid is injected into a gap through ink jetting or dispensing and then the liquid is cured. The composition has high adhesiveness and high-temperature stability during curing. Therefore, the composition can be used to bind or mold glass parts of organic and inorganic light-emitting display screens.

5 Claims, No Drawings

HIGH TEMPERATURE STABILITY EPOXY RESIN COMPOSITION AND ENCAPSULATION MATERIAL COMPRISING THE SAME

TECHNICAL FIELD

The present invention relates to an epoxy resin composition having high-temperature stability and to an encapsulant including the same, in which the composition is applicable to various gap filling methods in which a low-viscosity liquid is injected into a gap through ink jetting or dispensing and then the liquid is cured and has high adhesiveness and high-temperature stability, thereby being capable of binding and molding glass parts of organic and inorganic light-emitting display screens.

BACKGROUND ART

As user demands for displays change, to cater to highly integrated, light, thin, and compact devices, the properties and methods of use of encapsulation materials have been changed physically and chemically. Conventionally, cathode ray tubes having electron beams and fluorescent materials therein, field emission displays using light emission of emitter arrays, plasma display panels using the photoelectric effect of plasma gas, liquid crystal displays using orientation and movement of liquid crystal molecules, etc. have been widely used in the industry. However, due to various problems such as the weight of the display itself, dynamic screen display quality, heat generation, burn-in phenomenon, high power consumption, etc., the display devices vary in the performance and lifespan. In order to overcome various drawbacks of such displays, organic light-emitting display devices were developed since the late 1980s. The organic light-emitting display is lighter than conventional displays and has excellent readability, contrast ratio, power efficiency, and response speed. However, it is known that the organic light-emitting display device also has drawbacks such as a burn-in phenomenon and vulnerability to changes in external temperature and humidity.

Conventionally, in order to overcome these drawbacks, a method of confining and sealing the organic light emitting display device in a heavy chamber made of glass or transparent inorganic material has been used, but this may cause significant problems in operability, handling reliability, and thinning of products. A liquid phase is favorable in terms that a user can freely adjust the display shape. The present invention provides a material beneficial to the development of a display device with high adhesiveness and high-temperature stability to solve the existing problems.

DISCLOSURE

Technical Problem

The present invention has been made to solve the described technical problem and thus provides an epoxy resin composition having high-temperature stability and an encapsulant including the same, the composition being applicable to various gap filling methods in which a low-viscosity liquid is injected into a gap through ink jetting or dispensing and the liquid is cured, generating a small amount of gas during curing, exhibiting high adhesiveness and high-temperature stability during curing, and being capable of binding and molding glass parts of organic and inorganic light emission display screens.

Technical Solution

In order to accomplish the above objective, the present invention provides an epoxy resin composition having high-temperature stability, the composition including: a highly adhesive epoxy resin including a compound represented by Chemical Formula 1; a diluted epoxy resin; a latent thermal curing agent; and a curing retarder.

[Chemical Formula 1]

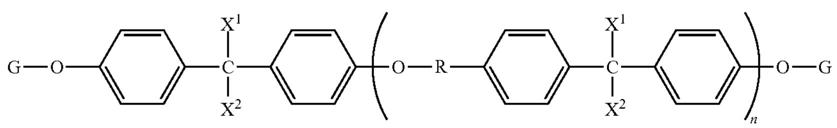

In Chemical Formula 1, G is a glycidyl group-containing organic group, $X^1$ and $X^2$ are each independently hydrogen or a methyl group, n is an integer in the range of 1 to 10, and R is a substituted or unsubstituted $C_{10}$-$C_{100}$ alkylene or alkenylene group.

The epoxy resin composition may include 5 to 150 parts by weight of the highly adhesive epoxy resin, 10 to 100 parts by weight of the diluted epoxy resin, 0.5 to 5.0 parts by weight of the thermal curing agent, and 0.01 to 1.0 parts by weight of the curing retarder.

The diluted epoxy resin includes at least one selected from the group consisting of i) an epoxy resin including a substituted or unsubstituted C5-100 alkyl, alkylene, or alkenylene group, ii) an epoxy resin including a cycloaliphatic group, and iii) an aromatic epoxy resin.

The diluted epoxy resin is prepared to include a compound selected from the group consisting of A-1 to A-6 below.

A-1

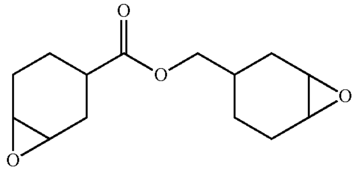

A-2

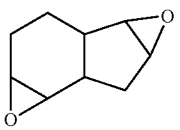

-continued

A-3

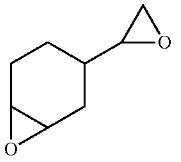

A-4

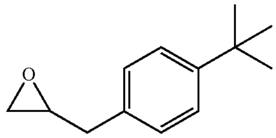

A-5

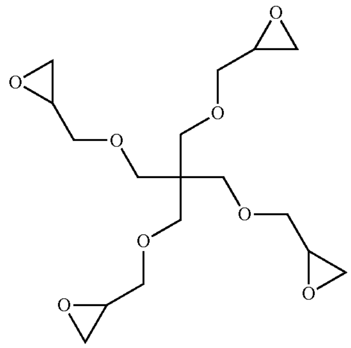

A-6

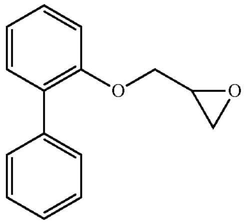

The thermal curing agent may be a latent thermal curing agent.

The curing retarder may be amide carboxylic acid.

BEST MODE

Hereinafter, an epoxy resin composition according to the present invention will be described in more detail.

Epoxy resin is a representative thermosetting resin having a three-dimensional network structure converted from a linear structure through a curing process. Since the epoxy resin has excellent properties such as heat resistance, corrosion resistance, adhesion, and insulation, the epoxy resin occupies an important position in the industry of electrical and electronic materials. The main reasons that these epoxy resins can be used in the field of electrical and electronic materials are i) there are various types of epoxy resins and curing agents therefor, thereby satisfying various physical properties required, ii) epoxy resins are excellent in intrinsic properties such as excellent adhesion, good mechanical properties, chemical resistance, iii) epoxy resins show relatively small shrinkage deformation during a curing reaction compared to other thermosetting resins, iv) epoxy resins have a long shelf life when properly formulated as a one-component product, and when an appropriate curing agent is used when being used to prepare a two-component product, do not produce by-products during a curing reaction, and iv) epoxy resins can be transfer-molded, coated, casted, and manually applied, thereby enabling formation of complicated shapes, thereby being suitably used to package electrical components.

In addition, the present invention has derived an epoxy resin composition that includes a highly refractive epoxy resin, a diluted epoxy resin, and a highly adhesive epoxy resin, thereby having high adhesiveness and high-temperature stability during curing while maintaining intrinsic mechanical, chemical, and thermal properties possessed by existing epoxy resins.

(A) Highly Adhesive Epoxy Resin

A highly adhesive epoxy resin according to the present invention is a bifunctional epoxy resin represented by Chemical Formula 1 below. The highly adhesive epoxy resin may contribute to the cured structure of an epoxy composition, relieve stress occurring between the substrates of a display, and promote adhesion between a chip and a substrate.

[Chemical Formula 1]

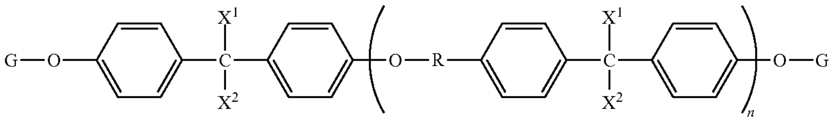

An encapsulant for a display device, which is another subject matter of the present invention for achieving the above objective, includes the epoxy resin composition having high-temperature stability.

Advantageous Effects

According to the present invention, the epoxy resin composition and encapsulant have excellent processability, electrical, mechanical, and chemical properties provided by the existing liquid epoxy materials, and additionally have excellent high-temperature stability, so that the user may be provided with good workability, productivity, and reliability when using the material.

In Chemical Formula 1, G is a glycidyl group-containing organic group, $X^1$ and $X^2$ are each independently hydrogen or a methyl group, n is an integer in the range of 1 to 10, and R is a substituted or unsubstituted $C_{10}$-$C_{100}$ alkylene or alkenylene group.

The difunctional epoxy resin represented by Chemical Formula 1 is preferably a diglycidyl ether-based bifunctional epoxy resin. Specifically, at least one selected from the group consisting of a bisphenol F diglycidyl ether-type epoxy resin, a bisphenol A diglycidyl ether-type epoxy resin, a polyolefin-added bisphenol A diglycidyl ether-type epoxy resin, a polyolefin-added bisphenol F diglycidyl ether-type epoxy resin, 1,6-hexanediol diglycidyl ether-type epoxy resin, and 1,4-butanediol diglycidyl ether-type epoxy resin.

In the present invention, the bifunctional epoxy resin is preferably included in an amount of 5 to 150 parts by weight.

When the content of the bifunctional epoxy resin is less than 5 parts by weight, the service time for which the product can be used at room temperature is reduced, and does not have a desirable effect on reliability under high temperature and high humidity conditions. In addition, since the inherent hardness of the composition is excessively high, it is not preferable because the composition is easy to break, and the excessively high hardness has a negative effect on adhesiveness.

(b) Diluted Epoxy Resin

The diluted epoxy resin may include at least one selected from the group consisting of i) an epoxy resin including a substituted or unsubstituted C5-100 alkyl, alkylene, or alkenylene group, ii) an epoxy resin including a cycloaliphatic group, and iii) an aromatic epoxy resin. Specifically, the diluted epoxy resin is prepared from a compound selected from the group consisting of A-1 to A-6.

A-1

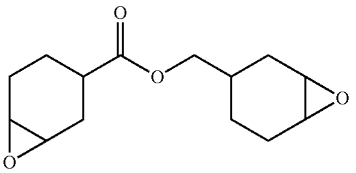

A-2

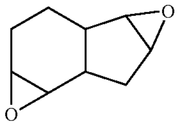

A-3

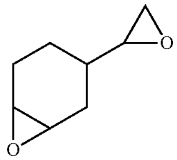

A-4

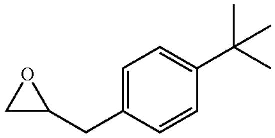

A-5

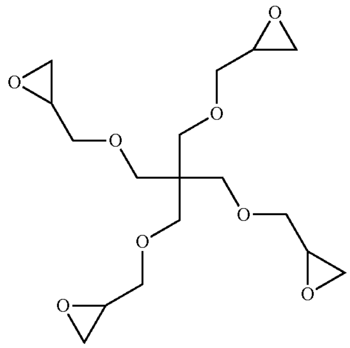

-continued

A-6

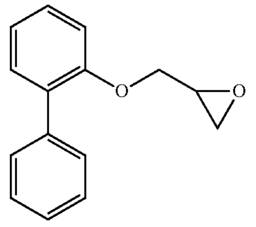

(C) Thermal Curing Agent

The thermal curing agent is a thermosetting polymer, and an appropriate curing agent must be present for the epoxy resin to perform its functions. When a curing reaction is performed in the presence of a curing agent, the unique properties possessed by the epoxy resin are exhibited. Conventionally, amine curing agents, acid curing agents, and phenol curing agents have been used. The curing agents have been selected and used to exhibit adhesion, electrical properties, and resistance to high temperature and high humidity, which are characteristics differentiating them from other plastic materials. The typical reaction between the epoxy resin and the amine curing agent will be described below. The amine curing agent attacks the ring of the epoxy resin to open the ring and attaches to a specific position so that the size of the epoxy-amine molecule increases and attaches the surrounding epoxy resin, thereby causing a chain reaction. The reaction ends when the molecules to which the amine is attached are almost consumed, and the reaction to create such a dense structure is called a curing reaction. In this reaction, a hydroxyl group necessarily appears and has a significant effect on adhesion and the pot life of a product. The hydroxyl group deteriorates moisture resistance and reliability, leading to cracking.

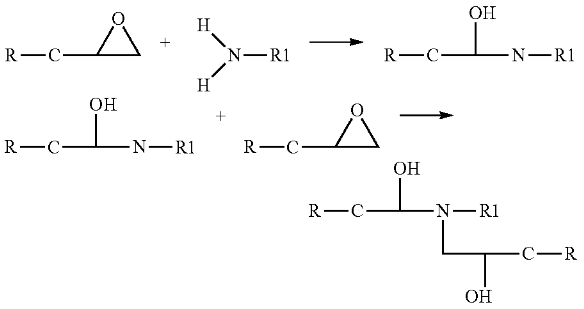

In the present invention, it is preferable to use a latent thermal curing agent that causes a direct reaction between epoxy resins as described below. In this reaction, a hydroxyl group does not appear unlike the above-described epoxy-amine reaction, and a cured product having a long fibrous molecular structure can be obtained. Therefore, unlike the conventional epoxy-curing agent reaction, a structure advantageous for long-term reliability can be obtained.

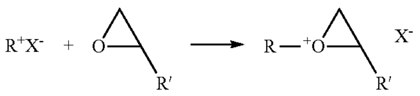

-continued

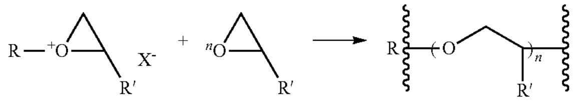

As the latent thermal curing agent used herein, any commercially available curing agent may be used. Specifically, one or more compounds selected from the group consisting of tetradecyl (trihexyl) phosphonium dicyandiamide, 1-butyl-3-methylimidazolium tetrafluoroborate, 1-ethyl-3-methylimidazolium tetrafluoroborate, 1-ethyl-3-methyl imidazolium methanesulfonate, tolylcumyl iodonium tetrakis(pentafluorophenyl)borate, Opton CP-66, Opton CP-77 (Adeka, Japan), 2-ethyl-4methyl imidazolium tetraphenylborate, tetra phenylphosphonium tetraphenylborate, quaternary ammonium borate, (4-acetoxyphenyl)benzyl (methyl)sulfonium, tetrakis (pentafluorophenyl)borate, SI-B2, SI-B3, SI-B3A, SI-B4, and SI-B7 (Samshin Chemical Industry Co., Ltd.)

In the present invention, the latent thermal curing agent is preferably included in an amount of 0.5 to 5.0 parts by weight, more preferably 0.5 to 3.0 parts by weight, and even more preferably 0.5 to 1.5 parts by weight. When the content of the latent thermal curing agent is lower than 0.5 parts by weight, it is undesirable because there is a possibility that an uncured product may occur. When the content of the latent thermal curing agent exceeds 1.5 parts by weight, it is undesirable because the pot life at room temperature or high temperature is reduced, there is risk of problematic exothermicity during curing, and the tip of a dispensing needle is likely to experience clogging and hardening in the case of a dispensing process. Therefore, the excessive amount of the latent thermal curing agent has a negative effect on the use of the product.

In the present invention, other typical latent curing agents can be used instead of the above-described latent thermal curing agents if such curing agents enable exhibition of the described physical and chemical properties. Commercially available products can be used. For example, Azicure mw-24, Azicure mw-h, Azicure PIN-23, Azicure PIN-H, Azicure PIN-31, Azicure PIN-40, Azicure PIN-50, VDH, VD H-J, HH-154, HH, DH, SH, IDH, SDH, LDH, UUDH, Anchor Mine 2441, Anchor Mine 2442, Anchamine 2014 A S, Technicure LCI-80, Technicure LC-100, Technicure LC-214, Technicure MDU-11, Technicure PDIU-250, Technicure IPDU-8, Technicure TDIU-200, H-4357, Novacure HX-3721, Novacure H-X-3722, Novacure H-X-3748, Novacure H-X-3741, Novacure H-X-3742, Novacure H-X-3088, Novacure H-X-3613, Novacure H-X-3921HP, Novacure HX-3941HP, Novacure HX-3932HP, FXR-1081, FXR-1020, FXR-1060, etc. can be used as latent curing agents. The materials may be used solely or in combination. These latent curing agents have the form of microcapsules in which an epoxy resin encloses an imidazole curing accelerator. Therefore, the curing reaction of the epoxy composition can be promoted only at high temperatures in the range of 80° C. to 100° C., and the capsule form contributes to storage stability at room temperature.

(D) Additive Including a Curing Retarder

The additive according to the present invention may include a curing retarder, and the curing retarder may be an amide represented by Chemical Formula 2 below. For reference, when stored at 40° C. or higher, the composition to which a cationic initiator is applied usually shows a change in viscosity because Lewis acid is generated.

[Chemical Formula 2]

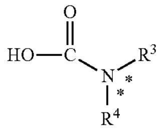

In Chemical Formula 2, $R^3$ and $R^4$ may be the same or different from each other, and may be an alkyl group.

Accordingly, in the present invention, a high-reliability resin with little change in viscosity can be obtained through the introduction of the curing retarder.

For reference, since amines are highly reactive, when an amine is added to a composition, the high-temperature stability of the composition is deteriorated. However, amide carboxylic acid can lower the reactivity of amines through resonance stabilization as shown below. Through this, reaction with Lewis acid of the cationic thermal initiator occurs at 40° C. or higher, thereby inhibiting the change in viscosity attributable to curing inhibition and improving high-temperature stability.

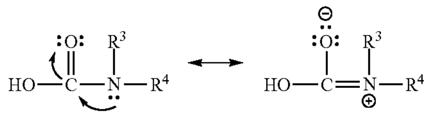

The epoxy resin composition according to the present invention may optionally further include an additional additive, if necessary. The additive is used to enhance the property of the epoxy composition to flow into a gap between the chip and the substrate, thereby preventing the presence of a gap between the chip and the substrate. For example, BYK 018, BYK 019, BYK 021, BYK 024, BYK 066N, BYK 909, ethoxy ethanol, mono ether glycol polyethylene, etc. may be used, but the examples of the additive are not limited thereto. Each of the above substances may be used solely, or two or more substances may be used in combination.

The additive may be added in an amount of 0.01 to 1.0 parts by weight. When the content of the additive is lower than 0.01 parts by weight, the desired effect cannot be obtained. When the content exceeds 1.0 parts by weight, the flowability is excessively increased, which is not preferable because the excessively high flowability may lead to deterioration of physical properties.

Hereinafter, the present invention will be described in more detail with reference to examples, but the present invention is not limited the examples.

EXAMPLES 1 TO 6 AND COMPARATIVE EXAMPLE

Preparation of Epoxy Resin Composition

A diluted epoxy resin and an adhesive epoxy resin were added in amounts shown in Table 1 to a planetary mixer. The components were then stirred at room temperature and atmospheric pressure for 2 hours to obtain a homogeneous mixture. A latent thermal curing agent and a curing retarder were weighted and added to the mixture. The resulting mixture was stirred at room temperature and atmospheric pressure for 2 hours. Defoaming was performed in vacuum. Thus, a viscous liquid was obtained.

TABLE 1

| | Blending ratio (parts by weight) | Example 1 | Example 2 | Example 3 | Example 4 | Example 5 | Example 6 | Comparative Example 1 | Comparative Example 2 |
|---|---|---|---|---|---|---|---|---|---|
| Diluted epoxy resin | A-1[1] | 80 | | | | | | 80 | 80 |
| | A-2[2] | | 80 | | | | | | |
| | A-3[3] | | | 80 | | | | | |
| | A-4[4] | | | | 80 | | | | |
| | A-5[5] | | | | | 80 | | | |
| | A-6[6] | | | | | | 80 | | |
| Adhesive epoxy resin | B-1[5] | 18.5 | 18.5 | 18.5 | 18.5 | 18.5 | 18.5 | | |
| | B-2[6] | | | | | | | 18.5 | 18.5 |
| Curing retarder | E[7] | 0.3 | 0.3 | 0.3 | 0.3 | 0.3 | 0.3 | | 0.3 |
| Latent thermal curing agent | C[8] | 1.2 | 1.2 | 1.2 | 1.2 | 1.2 | 1.2 | 1.2 | 1.2 |

[1] A-1: bifunctional liquid epoxy resin, (3',4'-epoxycyclohexane)methyl 3,4-epoxycyclohexylcarboxylate
[2] A-2: bifunctional solid epoxy resin, 2H-indeno[1,2-b:5,6-b']bisoxirene, octahydro-
[3] A-3: monofunctional liquid epoxy resin, 1,2-Epoxy-4-(epoxyethyl)cyclohexane
[4] A-4: monofunctional liquid epoxy resin, (4-tert-Butyl-benzyl)-oxirane
[5] A-5: tetrafunctional liquid epoxy resin, pentaerythritol tetraglycidyl ether
[6] A-6: monofunctional liquid epoxy resin, 2-biphenylyl glycidyl ether
[7] B-1: bifunctional liquid epoxy resin, bisphenol A-bisphenol A diglycidyl ether polymer
[8] B-2: bifunctional liquid epoxy resin, 2,2-bis(4-glycidoxyphenyl)propane
[9] E: additive, amide carboxylic acid compound
[10] C: latent thermal curing agent, phenyl amine borate Evaluation of Fundamental Characteristics of Epoxy Resin Composition The viscosity, adhesiveness, and high-temperature stability (40° C.) of the epoxy resin compositions prepared in Examples 1 to 6 and of the epoxy compositions prepared in Comparative Examples 1 to 2 were evaluated, and the results are shown in Table 2 below.

TABLE 2

| | Example 1 | Example 2 | Example 3 | Example 4 | Example 5 | Example 6 | Comparative Example 1 | Comparative Example 2 |
|---|---|---|---|---|---|---|---|---|
| Viscosity (mPa · s) | 500 | 300 | 300 | 300 | 300 | 600 | 500 | 400 |
| Adhesiveness ($kgf/cm^2$) | 5 | 7 | 7 | 5 | 6 | 5 | 5 | 3 |
| High-temperature stability (40° C.) | 9 days | 9 days | 9 days | 10 days | 9 days | 10 days | 4 days | 5 days |

1. Viscosity: Brookfield DV2T viscometer, a cone-and-plate type CPA-51Z spindle was used, the viscosity was measured at 25 ± 5° C., and the viscosity was recirded after 30 minutes of measurement.
2. Adhesion strength: after applying 0.01 g of an epoxy composition on a 76 mm × 26 mm × 3 mm glass plate, the epoxy composition was pressed and cured in an oven at 100° C. for 60 minutes, and the adhesive strength was measured in UTM
3. High-temperature stability (40° C.): a glass bottle sealed with a rubber stopper was filled with an epoxy composition and nitrogen gas, the glass bottle was statined at 40 ± 5° C., the viscosity was measured every day, and the viscosity was recorded when change in the viscosity is 1.2 times or less compared to the initial viscosity.

As shown in Table 2, it was confirmed that the epoxy compositions prepared in Examples 1 to 6 of the present invention had an appropriate viscosity level, high adhesiveness, and good storage stability. In particular, when the amide carboxylic acid compound was included as in Examples 1 to 6, the high-temperature stability was increased. In particular, when the bifunctional bisphenol A-bisphenol A diglycidyl ether polymer was used as in Examples 1 to 6, high adhesion and high-temperature stability were obtained. On the basis of the results of the above physical property evaluation, it was confirmed that the epoxy resin compositions of Examples 1 and 6 can be usefully used as an encapsulant composition for a display device.

As described above, a specific part of the present disclosure has been described in detail, and those who ordinarily skilled in the art will appreciate that the specific description is only a preferred embodiment and the scope of the present disclosure is not limited by the specific description. Thus, the substantial scope of the present invention will be defined by the appended claims and their equivalents.

The invention claimed is:

1. An epoxy resin composition having high-temperature stability, the composition comprising:
- a highly adhesive epoxy resin comprising a compound represented by Chemical Formula 1;
- a diluted epoxy resin;
- a latent thermal curing agent; and
- a curing retarder, wherein the curing retarder is an amide carboxylic acid,

[Chemical Formula 1]

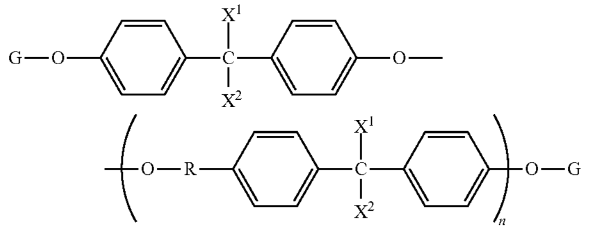

in Chemical Formula 1, G is a glycidyl group-containing organic group, $X^1$ and $X^2$ are each independently hydrogen or a methyl group, n is an integer in the range of 1 to 10, and R is a substituted or unsubstituted $C_{10}$-$C_{100}$ alkylene or alkenylene group.

2. The composition of claim 1, comprising 5 to 150 parts by weight of the highly adhesive epoxy resin, 10 to 100 parts by weight of the diluted epoxy resin, 0.1 to 10 parts by weight of the latent thermal curing agent, and 0.1 to 1.0 parts by weight of the curing retarder.

3. The composition of claim 1, wherein the diluted epoxy resin is one or more substances selected from the group consisting of i) an epoxy resin including a substituted or unsubstituted C5-100 alkyl, alkylene, or alkenylene group, ii) an epoxy resin including a cycloaliphatic group, and iii) an aromatic epoxy resin.

4. The composition of claim 3, wherein the diluted epoxy resin is prepared to include a compound selected from the group consisting of A-1 to A-6:

A-1

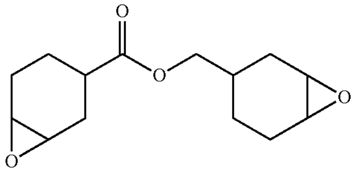

A-2

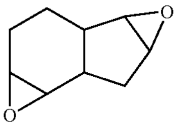

-continued

A-3

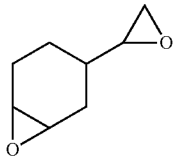

A-4

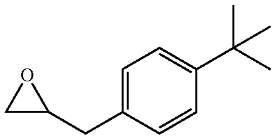

A-5

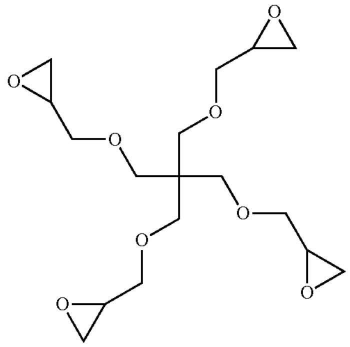

A-6

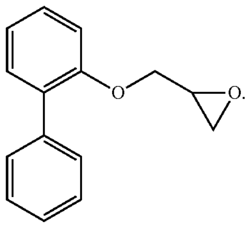

5. An encapsulant for a display device, the encapsulant comprising the epoxy resin composition of claim 1.

* * * * *